United States Patent [19]

Kojima et al.

[11] 4,237,334
[45] Dec. 2, 1980

[54] LAMINATED INSULATING PAPER AND OIL-FILLED CABLE INSULATED THEREBY

[75] Inventors: Takeshi Kojima, Chigasaki; Sakae Kinoshita, Yamato; Kenzo Takeuchi, Tokyo, all of Japan

[73] Assignee: Showa Electric Wire & Cable Co., Ltd., Kanagawa, Japan

[21] Appl. No.: 929,370

[22] Filed: Jul. 31, 1978

[30] Foreign Application Priority Data

Aug. 6, 1977 [JP] Japan .................. 52-94385
Nov. 7, 1977 [JP] Japan .................. 52-133291
Mar. 1, 1978 [JP] Japan .................. 53-23185

[51] Int. Cl.³ .................. H01B 9/06; B32B 9/04; B32B 15/08
[52] U.S. Cl. .................. 174/25 R; 174/25 C; 174/110 S; 174/110 P; 174/121 B; 174/120 FP; 156/51; 156/52; 156/53; 156/244.11; 156/244.12; 156/244.27; 156/334; 156/307.7 427/118; 427/333; 428/380; 428/383; 428/390; 428/391; 428/447; 428/449; 428/452; 428/513; 428/420; 264/272; 264/135

[58] Field of Search .............. 428/452, 449, 447, 420, 428/380, 383, 391, 513, 390; 174/25 C, 25 R, 110 S, 110 P, 120 FP, 121 B; 264/272, 174, 135; 427/118, 333; 156/52, 53, 51, 244.11, 244.12, 244.27, 309, 339, 334

[56] References Cited

U.S. PATENT DOCUMENTS

| | | | |
|---|---|---|---|
| 3,194,872 | 7/1965 | Garner | 174/25 R |
| 3,594,489 | 7/1971 | Katz | 174/25 R |
| 3,646,155 | 2/1972 | Scott | 260/23 H |
| 3,773,965 | 11/1973 | Reynolds | 174/120 FP |
| 3,775,549 | 11/1973 | Matsuda | 174/25 R |
| 3,802,913 | 4/1974 | Mackenzie | 428/389 |
| 3,840,393 | 10/1974 | Ishizaka | 174/110 S |
| 3,930,112 | 12/1975 | Pasini | 174/25 C |
| 3,957,719 | 5/1976 | Mackenzie | 264/174 |
| 3,959,162 | 5/1976 | Nishimatsu | 174/25 C |
| 4,117,195 | 9/1978 | Swarbrick | 174/110 S |

Primary Examiner—Ellis P. Robinson
Attorney, Agent, or Firm—George A. Loud

[57] ABSTRACT

The present invention relates to a laminated insulating paper formed of cellulose paper or papers which is adhered to at least one side of cross-linked silicone grafted polyolefine film and to an oil-filled (OF) cable which insulated by the laminated insulating paper. The laminated insulating paper has outstanding peel strength as well as excellent non-solubility and anti-swelling properties in insulating oils.

12 Claims, 8 Drawing Figures

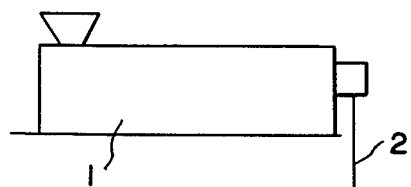
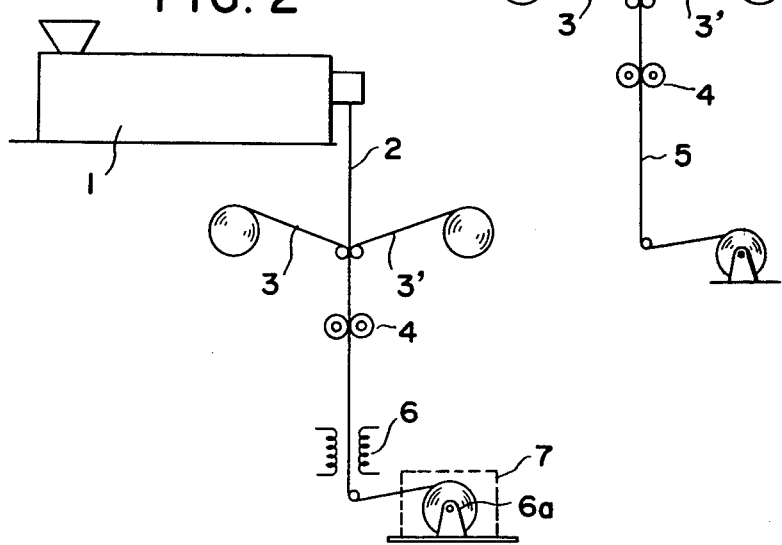
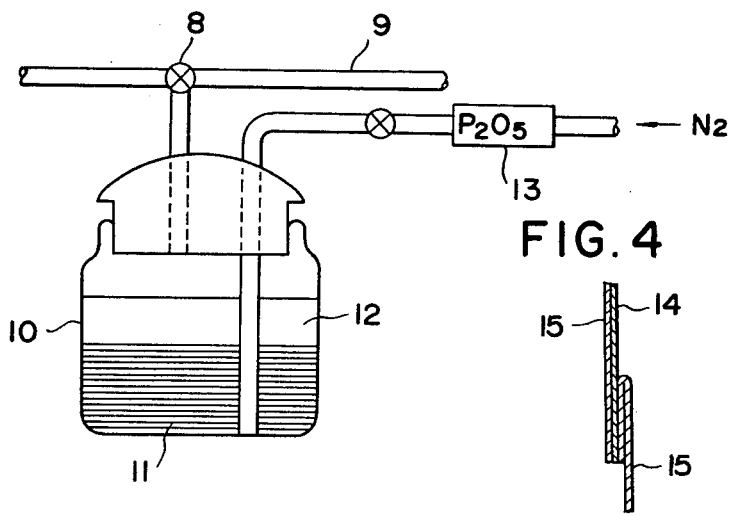

LAMINATED INSULATING PAPER AND OIL-FILLED CABLE INSULATED THEREBY

BACKGROUND OF THE INVENTION

The present invention relates to a laminated insulating paper composed of a cross-linked silicone grafted polyolefine film and cellulose paper or papers adhering to at least one side of the film and to an oil-filled (OF) cable insulated by the laminated insulating paper.

Recently, the development of power cables of the 500KV class has been advanced with the increased demand of electricity in cities and industrial areas.

When an electric insulating paper composed of conventional cellulose paper alone is used in such very high-voltage cables, there is such a great dielectric loss, that conventional electric insulating paper is unsuitable for use in long-distance transmission cables.

Although the use of a plastic film instead of conventional cellulose paper has been investigated, the plastic film may often craze and crack, when it is used in combination with an insulating oil for a long period of time.

In addition, the plastic film has a disadvantage that the oil flow (radial) resistance is high and thus a long period of time is required for filling the cable up with oil. Recently an electric insulating paper which is obtained by laminating polypropylene film and cellulose paper has been developed. [e.g. D. R. Edwards, D. R. G. Melville, "An Assessment of the Potential of EHV Polypropylene/Paper Laminate Insulated Self-Contained Oil-Filled Cables", IEEE 1974 Underground Transmission and Distribution Conference, Dallas, April 1974, Page 529, and K. Matsumura, H. Kubo, T. Miyazaki, "Development of Polypropylene Laminated Paper Insulated EHV Power Cables", IEEE 1976 Underground Transmission and Distribution Conference, Atlantic City, September 1976, Page 322, E. M. Allam, W. H. Cortelyou, H. C. Doepken, Jr., "Low-loss 765KV Pipe-type Power Cable" F 78 175-2. the IEEE Insulated Conductors Committee of the IEEE Power Engineering Society for presentation at the IEEE PES Winter Meeting, New York, NY, January 29 - February 3, 1978]. However, since the above-mentioned electric insulating paper is a product obtained by mere heat-adhesion of non-cross-linked propylene film and cellulose paper, the peel strength between polypropylene film and cellulose paper is decreased, when it is contacted by an insulating oil for a long period of time. Further, the polypropylene film and cellulose paper peel form each other, when the insulating paper is bent, thus resulting in wrinkles and bucklings.

SUMMARY OF THE INVENTION

Accordingly, it is an object of the present invention to provide a laminated insulating paper with high peel strength which is formed by adhering cellulose paper or papers to one or both sides of a cross-linked silicone grafted polyolefine film.

It is another object of the present invention to provide a process for producing a laminated insulating paper by pressure-adhering cellulose paper or papers to one or both sides of softened silicone grafted polyolefine film which has been extruded in an un-cross-linked state, and cross-linking said silicone grafted polyolefine film by reaction with water in the presence of a silanol condensation catalyst.

It is a further object of the present invention to provide a method for improving the peel strength of a laminated insulating paper by heat-treating the laminated insulating paper obtained by adhering cellulose paper or papers to one or both sides of cross-linked silicone grafted polyolefine film.

It is a still further object of the present invention to provide an OF cable insulated by a laminated insulating paper obtained by adhering cellulose paper or papers to one or both sides of cross-linked silicone grafted polyolefine film.

These and other objects of the present invention will become apparent from the following description of embodiments thereof when taken together with the drawings.

BRIEF DESCRIPTION OF THE DRAWINGS

FIG. 1 and FIG. 2 show a process for producing the laminated insulating paper of the present invention, FIG. 3 shows an apparatus for testing the oil-resistance of various films, FIG. 4 shows a cross sectional view illustrating a peeled state of laminated insulating paper in peel test.

DETAILED DESCRIPTION OF PREFERRED EMBODIMENTS

Figure 5:
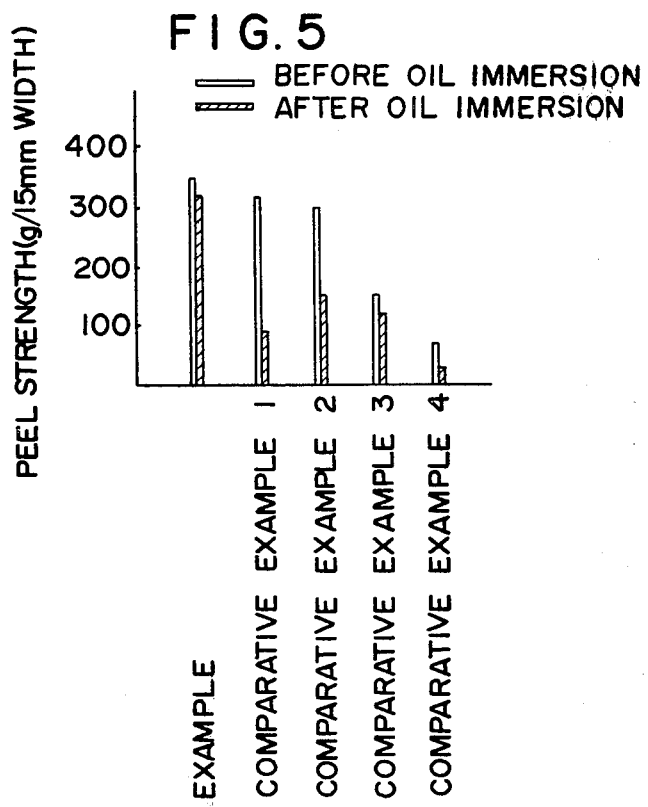
FIG. 5 is a bar graph showing the peel strength of the laminated insulating paper of the present invention.

As shown in FIG. 1, for example, the laminated insulating paper of the present invention is produced by pressure-adhering cellulose papers to both sides of a un-cross-linked silicone grafted polyolefine film in a softened state. The film contains a silanol condensation catalyst and is produced by an extrusion method and by cross-linking the film. That is, in the production of the laminated insulating paper of the present invention, un-cross-linked silicone grafted polyolefine and an effective amount (generally, 0.01-3 parts per 100 parts of the polyolefine) of the silanol condensation catalyst are introduced into an extruder (1) having a T die at the extruder head. Silicone grafted polyolefine containing the silanol condensation catalyst is then extruded in a film state from the T die of the extruder (1). While the silicone grafted polyolefine film extruded from the extruder (1) is still in a softened state, the cellulose papers (e.g. kraft insulating papers) (3) and (3') are affixed on both sides of the film respectively and pressed by the heat-roll (4) to provide the laminated insulating paper (5). The silanol condensation catalyst-containing silicone grafted polyolefine film (2), interpositioned between the cellulose papers (3) and (3'), is, with the lapse of time, cross-linked by reaction with water which has been adsorbed to hydrophilic OH groups in the cellulose papers (3) and (3') to provide a high peel-strength film. As shown in the following examples, the peel strength between kraft insulating paper and the silicone grafted polyolefine film is very large compared with conventional heat-adhesion and it is believed that a part of hydrolyzable silyl groups of the silicone grafted polyolefine film is directly reacted with OH groups of cellulose paper.

According to the present invention, the peel strength of the laminated insulating paper can be further improved by heat-treatment. In case that, after the above-mentioned laminating step, sufficient peel strength is required for a short time or higher peel strength is required. As described below, improvement of the peel strength of the laminated insulating paper is accomplished during the production of the laminated insulating paper. That is, as shown in FIG. 2, the cellulose papers (e.g. kraft insulating papers) (3) and (3') are respectively affixed on both sides of the silanol condensation catalyst-containing silicone grafted polyolefine film (2) extruded from the extruder (1) while the film (2) is still in a softened state. The polyolefine film (2) on both sides of which the cellulose papers (3) and (3') are affixed is then pressed by the heating roll (4) and preliminarily heat-treated by a heating apparatus (6) such as an infrared heating apparatus. After being wound on the winding reel (6a), the laminated paper is heat-treated at a predetermined temperature for a constant time in a heating room (7) accommodating the winding reel (6a) or in a separate heating room. The desired heating temperature is from 40° C. to a temperature at which the cellulose paper or the silicone grafted polyolefine film will deteriorate, preferably from 40° C. to 150° C. and more preferably from 80° C. to 110° C. The heating time is appropriately selected within the range of from 30 minutes to 50 hours so that the maximum peel strength can be obtained. A lower heating temperature requires a longer heating time. In contrast, when the heating temperature is higher, a shorter heating time is satisfactory.

According to this embodiment, the adhesion of the cellulose papers to the silicone grafted polyolefine film can be performed completely by heat-treatment to give the laminated insulating paper a high peel strength even when use of the heating roll is insufficient for this purpose.

The silicone grafted polyolefine used in the present invention is obtained by adding to polyolefine, such as a high density, middle density or low density polyethylene preferably having a density of 0.925-0.965 (g/cc) or to polypropylene, preferably 0.01-2.0 weight % of radical generating agent such as dicumylperoxide (DCP) and 0.1-5.0 weight % of hydrolyzable silyl group containing compound such as vinyltrimethoxysilane (VTMOS) and vinyltriethoxysilane (VTEOS). The foregoing are supplied to an apparatus having both heating and mixing functions such as an extruder and heat-mixing them at about 200° C.

The silicone grafted polyolefine thus obtained is generally pelleted.

To the silicone grafted polyolefine pellets is added a master batch containing the silanol condensation catalyst such as dibutyltindilaurate and dibutyltindiacetate. As described before, the mixture is supplied to the extruder having a T die and extruded as the un-cross-linked silicone grafted polyolefine film. The silanol condensation catalyst may be added before or during the production of silicone grafted polyolefine or alternatively after the production of silicone grafted polyolefine film (e.g. by application of the catalyst to the film surface). The production of silicone grafted polyolefine is described in detail in U.S. Pat. No. 3,646,155.

In the laminated insulating paper of the present invention, suitable thicknesses for the cellulose paper and the silicone grafted polyolefine film are 10-70μ and 40-120μ thick, respectively. The thickness after lamination is preferably 100-250μ.

The laminated insulating paper thus obtained can be used as a component material the insulating layer an oil impregnated electric apparatus or device such as an OF cable, transformer and condenser in accordance with known procedures.

As shown in the following examples, the silicone grafted polyolefine in the laminated insulating paper has a lower solubility in insulating oils and less swelling against insulating oils than does polypropylene. It has especially excellent non-solubility and anti-swelling properties against diarylalkane represented by the general formula;

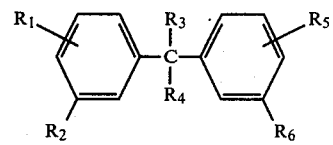

wherein $R_1$ to $R_6$ (inclusive) are a lower alkyl group or hydrogen atom and at least one of $R_1$, $R_2$, $R_5$ and $R_6$ is a lower alkyl group.

When the laminated insulating paper of the present invention is used as a material for forming the insulating layer of OF cables, it is preferable to use diarylalkane as an insulating oil. However, this does not mean that the use of known insulating oils such as dodecylbenzene and polybutene is excluded.

Experimental

As illustrated in FIG. 3, 30 g of the film sample (11) and 300 c.c. of the insulating oil sample (12), the moisture content of which had been adjusted to less than 10 ppm, are placed in the wide mouth ground glass bottle (10) (500 c.c.) equipped with the quartz tube (9) having the three way stop-cock (8). After being passed through the $P_2O_5$ moisture absorbing agent (13), dried $N_2$ gas was blown into the bottle (10) to replace the air therein with $N_2$ gas.

Subsequently, each cock was closed and the wide mouth bottle (10) was put in a thermostat at a temperature of 100° C. to deteriorate the film. The changes in the viscosity and insulating resistance of insulating oils as well as the changes in the thickness and dimensions of films were observed. The results are shown in the following Tables.

"Condenser oil SAS 10 E" in the following Tables is a synthetic insulating oil, the chemical structure and properties of which are as follows:

Chemical structure:

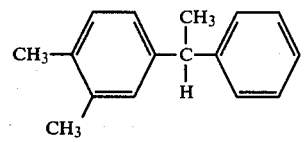

Flash point: 156° C.
Viscosity (at 30° C.): 6.5 cst
Viscosity (at 75° C.): 2.3 cst
Pour point: < −50° C.
Dielectric constant (at 80° C.): 2.55
Dielectric loss tangent (at 80° C.): 0.014%

Volume specific resistance (at 80° C.): $5.1 \times 10^{14}$ Ω.cm

[Change of Viscosity of Insulating Oils]

| | Initial values cst | After aging 1 day cst | After aging 5 days cst | After aging 10 days cst | After aging 30 days cst | Rate of increase of viscosity after 30 days % |
|---|---|---|---|---|---|---|
| Dodecyl benzene | 11.6 | 11.8 | 11.7 | 11.8 | 11.6 | 0 |
| Dodecyl benzene + Polypropylene film | " | 13.2 | 13.0 | 13.0 | 13.1 | 13 |
| Dodecyl benzene + Cross-linked silicone grafted polyethylene film | " | 12.2 | 12.1 | 12.2 | 12.2 | 5.2 |
| Condenser oil SAS 10 E | 6.5 | 6.5 | 6.5 | 6.4 | 6.5 | 0 |
| Condenser oil SAS 10 E + Polypropylene film | " | 7.2 | 7.3 | 7.2 | 7.2 | 11 |
| Condenser oil SAS 10 E + Cross-linked silicone grafted polyethylene film | " | 6.7 | 6.7 | 6.7 | 6.7 | 3.2 |

[measured at 30° C.]

[Change of Insulating Resistance of Insulating Oils]

| | Initial values Ω.cm | After aging 1 day Ω.cm | After aging 5 days Ω.cm | After aging 10 days Ω.cm | After aging 30 days Ω.cm | Rate of decrease of insulating resistance after 30 days % |
|---|---|---|---|---|---|---|
| Dodecyl benzene | $3.4 \times 10^{15}$ | $3.0 \times 10^{15}$ | $2.6 \times 10^{15}$ | $2.1 \times 10^{15}$ | $2.0 \times 10^{15}$ | 0 |
| Dodecyl benzebe + Polypropylene film | " | $9.8 \times 10^{14}$ | $6.4 \times 10^{14}$ | $3.7 \times 10^{14}$ | $1.1 \times 10^{14}$ | 10.0 |
| Dodecyl benzene + Cross-linked silicone grafted polyethylene film | " | $0.8 \times 10^{15}$ | $9.4 \times 10^{14}$ | $8.6 \times 10^{14}$ | $7.4 \times 10^{14}$ | 6.4 |
| Condenser oil SAS 10 E | $5.1 \times 10^{14}$ | $4.9 \times 10^{14}$ | $4.3 \times 10^{14}$ | $4.0 \times 10^{15}$ | $3.1 \times 10^{14}$ | 0 |
| Condenser oil SAS 10 E + polypropylene film | " | $2.4 \times 10^{14}$ | $9.7 \times 10^{13}$ | $8.2 \times 10^{13}$ | $6.4 \times 10^{13}$ | 7.9 |
| Condenser oil SAS 10 E + Cross-linked silicone grafted polyethylene film | " | $3.7 \times 10^{14}$ | $2.9 \times 10^{14}$ | $2.3 \times 10^{14}$ | $1.8 \times 10^{14}$ | 4.2 |

[measured at 80° C.]

[Change of Thickness of Films]

| | Initial value | After aging 1 day | 5 days | 10 days | 30 days |
|---|---|---|---|---|---|
| Dodecyl benzene + Polypropylene film | 0.10 mm | 0.113 mm | 0.123 mm | 0.125 mm | 0.128 mm |
| Dodecyl benzene + Cross-linked silicone grafted polyethylene film | " | 0.105 | 0.112 | 0.114 | 0.115 |
| Condenser oil SAS 10 E + Polypropylene film | — | 0.108 | 0.111 | 0.113 | 0.114 |
| Condenser oil SAS 10 E + Cross-linked silicone grafted polyethylene film | — | 0.104 | 0.105 | 0.108 | 0.110 |

[Change of Dimensions of Films
(Difference of Shrinkage of Longitudinal
and Transverse Dimensions)]

| | After aging | | | |
|---|---|---|---|---|
| | 5 hours | 10 hours | 100 hours | 1000 hours |
| Dodecyl benzene + Polypropylene film | 16% | 18% | 20% | 21% |
| Dodecyl benzene + Cross-linked silicone grafted polyethylene film | 8 | 9 | 10 | 11 |
| Condenser oil SAS 10E + Polypropylene film | 9 | 10 | 12 | 13 |
| Condenser oil SAS 10E + Cross-linked silicone grafted polyethylene film | 3 | 4 | 5 | 7 |

EXAMPLE 1

| Silicone grafted polyethylene pellets | | |
|---|---|---|
| High density polyethylene (density: 0.965 (g/cc)) | 100 | |
| VTMOS | 2 | 90 parts |
| DCP | 0.12 | |
| Master batch pellets | | |
| High density polyethylene (density: 0.965 (g/cc)) | 100 | |
| DBTDL | 1 | 10 parts |
| Anti-oxidant | 1 | |

The above described mixture was introduced into the extruder equipped with a T die from which a film with a thickness of 60μ was extruded. While the film was still in a softened state, condenser papers with a thickness of 40μ were applied by pressure-adhering to both sides of the film to form a laminated insulating paper in which the film is inserted between the cellulose papers. The silicone grafted polyethylene film was cross-linked by storing the laminated paper in a room for 2 weeks. As shown in FIG. 4, peel strength was measured by means of an auto graph tester at a pulling rate of 100 mm/min whereby the silicone grafted high density polyethylene film (14) was stood vertically and one of the condenser papers (15) was folded back at an angle of 180°. The results are shown in FIG. 5 which describes data on peel strength after oil immersing laminated papers in a synthetic oil (dodecyl benzene) at 80° C. for 1 hour.

In comparative examples 1 to 4 (inclusive), the laminated papers with the following structures were used.

Comparative example 1: Low density weight polyethylene film (thickness of 100μ) and two sheets of condenser paper (40μ) were subjected to press-adhering at 150° C.

Comparative example 2: High density weight polyethylene film (100μ) and two sheets of condenser paper (40μ) were subjected to press-adhering at 180° C.

Comparative example 3: Polypropylene film (60μ) and two sheets of condenser paper (40μ) were subjected to press-adhering at 220° C.

Comparative example 4: Softened polypropylene film extruded by an extrusion method and two sheets of condenser paper (60μ) were subjected to press-adhering.

Figure 6:
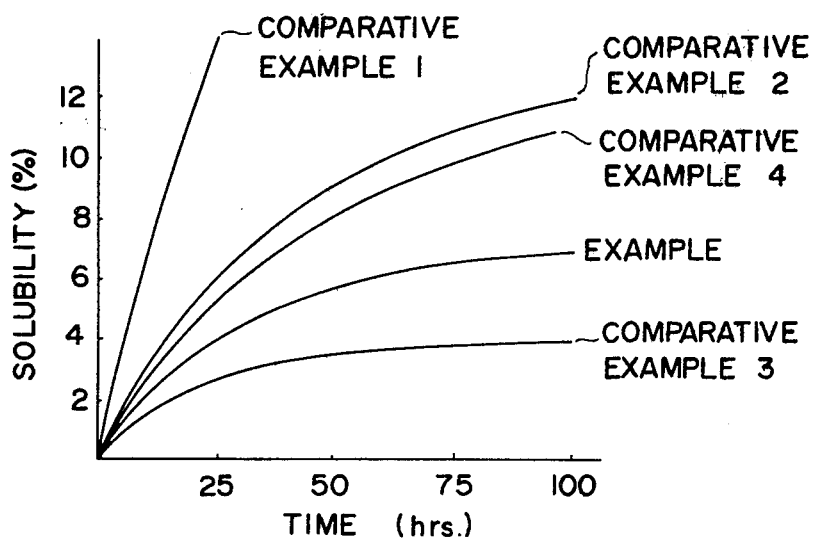
FIG. 6 is a graph showing the oil-resistance of cross-linked silicone grafted polyolefine.

The above laminated papers were immersed in a synthetic oil (dodecylbenzene) at 100° C. and their solubility was measured. The results are shown in FIG. 6.

EXAMPLE 2

In this example, the same silicone grafted polyethylene pellets and master batch pellets as in Example 1 were used.

Figure 7:
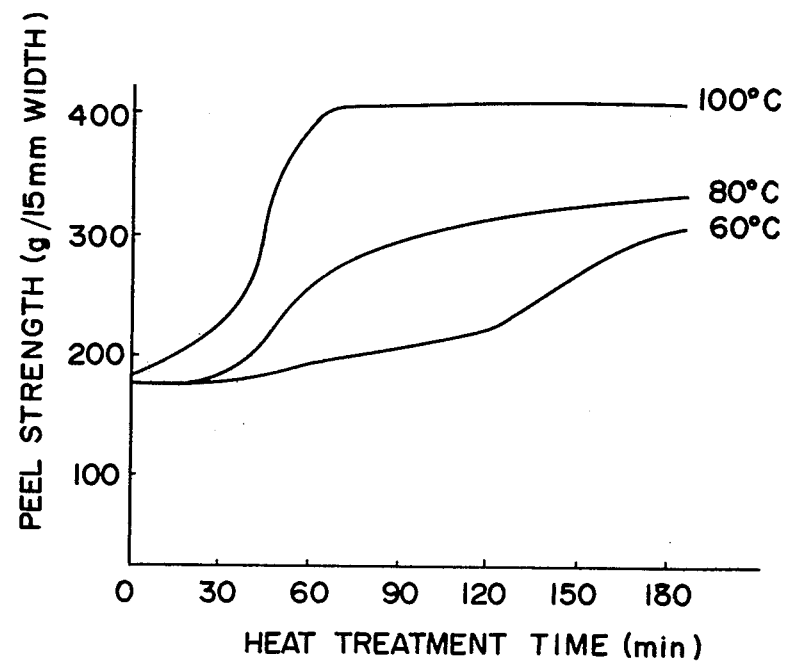
FIG. 7 is a graph showing the improvement of peel strength of laminated insulating paper by heat-treatment.

By employing the same basic procedures as in Example 1, there was obtained a laminated paper in which the cross-linked silicone grafted high density polyethylene film with a thickness of 100μ was positioned between two sheets of the condenser paper with a thickness of 50μ. The laminated paper obtained was heat-treated at a heat-treatment temperature of 60° C., 80° C. or 100° C. and the peel strength was measured in accordance with the same procedures as in Example 1. The results are shown in FIG. 7.

EXAMPLE 3

Figure 8:
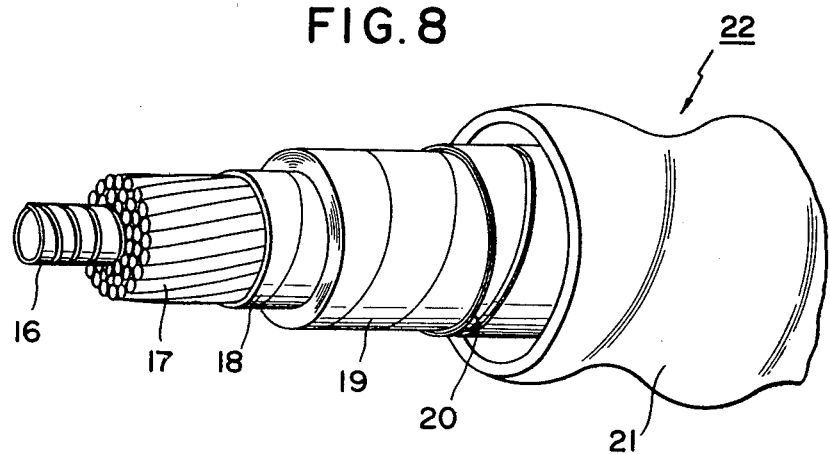
FIG. 8 is a perspective view of a model OF cable in which the laminated insulating paper is used.

As illustrated in FIG. 8, a metallized carbon paper (18) superposed in double layers was wound on the strand conductor (17) of 325 mm² having an oil conduct composed of the spiral metal tube 16. A laminated insulating paper (19) having a width of 21 mm was wound on the metallized carbon paper (18) at a 1–2 mm butt gap and a 65/35 registration so that the wound laminated insulating paper (19) has a thickness of 7 mm. The laminated insulating paper (19) used was obtained by laminating kraft papers (50μ) on both sides of cross-linked silicone grafted high density polyethylene film (50μ). A metallized paper (20) was further gap-wound on the laminated insulating paper (19). Finally, the corrugated Aluminum sheath (21) was jacketed on the metallized paper (20) and a condenser oil of SAS 10 E was impregnated to provide a model OF cable (22).

The electric properties of the cable (22) were measured. The results are shown in the following Table.

| | | Example 3 | Comparative example 5* |
|---|---|---|---|
| tanδ (%) | 10 KV/mm | 0.061 | 0.074 |
| | 20 KV/mm | 0.070 | 0.088 |
| | 30 KV/mm | 0.085 | 0.103 |
| | | alternately reversed bend(s) at 15 times of diameter | |
| AC breakdown voltage (KV/mm) | | no  1  3 | no  1  3 |
| | | 69–73  68–73  70–73 | 65–70  51–55  43–47 |
| Imp. breakdown voltage | | 136–142  134–143  130–140 | 130–136  102–107  89–96 |

-continued (KV/mm)

*The cable used in Comparative example 5 was a model cable produced in the same manner as in Example 3 excepting that the laminated insulating paper in Example 3 is substituted with the laminated insulating paper of Comparative example 3 shown in Example 1.

There is thus provided in accordance with the present invention a laminated paper and an OF cable insulated thereby which have the advantages discussed above. The embodiments described are intended to be merely exemplary and those skilled in the art will be able to make variations and modifications in them without departing from the spirit and scope of the inventions. All such modifications and variations are contemplated as falling within the scope of the claims.

What is claimed:

1. A laminated electrical insulating wrapping material comprising a plastic film of a cross-linked silicone grafted polyolefin and a cellulose paper or papers laminated to at least one side of said film, said laminated insulating material produced by the process comprising:
   (a) melt-extruding an un-cross-linked silicone grafted polyolefin to form a softened film;
   (b) superimposing said paper or papers onto one side of said softened film;
   (c) applying pressure to said superimposed paper and softened film to form a laminate; and
   (d) cross-linking said laminated silicone grafted polyolefin film by reaction with water in the presence of a silanol condensation catalyst and forming a chemical bond between the silyl groups of said silicone grafted polyolefin film and the hydroxyl groups of said cellulose paper.

2. The laminated insulating paper according to claim 1, wherein the silicone grafted polyolefin is silicone grafted polyethylene.

3. The laminated insulating paper according to claim 1, wherein the plastic film has a thickness of approximately 40–120μ and the cellulose paper or papers has a thickness of approximately 10–70μ.

4. A process for producing a laminated electrical insulating material comprising:
   (a) melt-extruding an un-cross-linked silicone grafted polyolefin to form a softened film;
   (b) superimposing a cellulose paper or papers onto one side of said softened film;
   (c) applying pressure to said superimposed paper and softened film to form a laminate; and
   (d) cross-linking said laminated silicone grafted polyolefin film by reaction with water in the presence of a silanol condensation catalyst and forming a chemical bond between the silyl groups of said silicone grafted polyolefin film and the hydroxyl groups of said cellulose paper.

5. A process for producing a laminated insulating paper which includes cellulose paper or papers laminated to at least one side of a plastic film, the process comprising the steps of:
   (a) extruding a mixture of un-cross-linked silicone grafted polyolefin pellets with master batch pellets of a silanol condensation catalyst to form a silicone grafted polyolefin film;
   (b) superimposing cellulose paper or papers on at least one side of said film;
   (c) applying pressure to laminate cellulose paper or papers and said superimposed extruded film while said film is still in a softened state; and
   (d) cross-linking said laminated silicone grafted polyolefin film by reaction with water in the presence of said silanol condensation catalyst and forming a chemical bond between the silyl groups of said silicone grafted polyolefin film and the hydroxyl groups of said cellulose paper.

6. A process for producing a laminated insulating paper which includes cellulose paper or papers laminated to at least one side of a plastic film, the process comprising the steps of:
   (a) extruding un-cross-linked silicone grafted polyolefin from an extruder to form a silicone grafted polyolefin film;
   (b) superimposing cellulose paper or papers on at least one side of said film;
   (c) applying pressure to laminate said superimposed cellulose paper or papers and extruded film while said film is still in a softened state;
   (d) cross-linking said silicone grafted polyolefin film of the laminate by reaction with water in the presence of a silanol condenation catalyst and forming a chemical bond between the silyl groups of said silicone grafted polyolefin film and the hydroxyl group of said cellulose paper; and
   (e) heat-treating the laminated film at a temperature of 40°–150° C. for a period of 30 minutes to 50 hours.

7. A process for producing a laminated insulating paper according to claim 6, wherein the heat-treatment is carried out at a temperature of 80°–110° C.

8. In an oil-filled electrical cable comprising an electric conductor, an insulating layer of wound laminated insulating paper applied over the electric conductor, an insulating oil impregnated in the insulating layer, and a metal sheath applied over the insulating layer, the improvement wherein:
   the laminated insulating paper comprises a plastic film formed of a cross-linked silicone grafted polyolefin film and cellulosic paper or papers laminated to at least one side thereof and produced by the process comprising,
   (a) melt-extruding an un-cross-linked silicone grafted polyolefin to form a softened film;
   (b) superimposing said paper or papers onto one side of said softened film;
   (c) applying pressure to said superimposed paper and softened film to form a laminate; and
   (d) cross-linking said laminated silicone grafted polyolefin film by reaction with water in the presence of a silanol condensation catalyst and forming a chemical bond between the silyl groups of said silicone grafted polyolefin film and the hydroxyl groups of said cellulose paper.

9. The oil-filled cable according to claim 8, wherein the silicone grafted polyolefin is silicone grafted polyethylene.

10. The oil-filled cable according to claim 8, wherein the plastic film has a thickness of approximately 40–120μ and the cellulose paper or papers has a thickness of approximately 10–70μ.

11. The oil-filled cable according to claim 8, wherein said insulating oil is a diaryl alkane.

12. A laminated electrical insulating wrapping material comprising a plastic film of a cross-linked silicone grafted polyolefin and a cellulose paper or papers laminated to at least one side of said film, said laminated insulating material produced by the process comprising:
(a) melt-extruding an un-cross-linked silicone grafted polyolefin to form a softened film;
(b) superimposing said paper or papers onto one side of said softened film;
(c) applying pressure to said superimposed paper and softened film to form a laminate;
(d) cross-linking said laminated silicone grafted polyolefin film by reaction with water in the presence of a silanol condensation catalyst and forming a chemical bond between the silyl groups of said silicone grafted polyolefin film and the hydroxyl group of said cellulose paper; and
(e) heat-treating the laminated film at a temperature of 40°–150° C. for a period of 30 minutes to 50 hours.

* * * * *

UNITED STATES PATENT AND TRADEMARK OFFICE
CERTIFICATE OF CORRECTION

PATENT NO. : 4,237,334
DATED : 2 December 1980
INVENTOR(S) : Kojima et al

It is certified that error appears in the above—identified patent and that said Letters Patent is hereby corrected as shown below:

Throughout the entire patent "polyolefine" should read ---polyolefin--- as follows:

In the abstract at line 5, and at
    Col. 1, lines 8, 58, 62-63 and 64;
    col. 2, lines 4,9,26,38,43,45,47,50,56,64 and 67; and,
    col. 3, lines 12,14,24,34,39,40,53,58,60,62,64 and 68.

In the abstract, line 5, "which" should read ---which is---.

Col. 1, line 25, delete "up";
         line 39, delete the "." ;
         line 47, delete the "," ;
         line 51, "bucklings" should read ---buckling--

Col. 3, line 3, delete ". In case that" and insert ---when---.

Col. 4, line 4, after "material" insert ---of---, after "layer" insert --of---;
         line 41, "replace" should read ---completely replace---;

Col. 9, line 15, "tions" should read ---tion---.

UNITED STATES PATENT AND TRADEMARK OFFICE
CERTIFICATE OF CORRECTION

PATENT NO. : 4,237,334
DATED : 2 December 1980
INVENTOR(S) : Kojima et al

It is certified that error appears in the above—identified patent and that said Letters Patent is hereby corrected as shown below:

Col. 4, line 9, "polyolefine" should be ---polyolefin---

Col. 8, line 39, "conduct" should read ---conduit---.

Signed and Sealed this

Fourteenth Day of April 1981

[SEAL]

Attest:

RENE D. TEGTMEYER

Attesting Officer     Acting Commissioner of Patents and Trademarks